United States Statutory Invention Registration [19]

[11] Reg. Number: H320

Reuter

[43] Published: Aug. 4, 1987

[54] ROBOTIC KITTING

[75] Inventor: Howard A. Reuter, Pasadena, Md.

[73] Assignee: The United States of America as represented by the Secretary of the Air Force, Washington, D.C.

[21] Appl. No.: 488,900

[22] Filed: Apr. 27, 1983

[51] Int. Cl.[4] ..... G06F 15/20; G06F 15/46; B65B 21/02

[52] U.S. Cl. ..... 364/468; 364/478; 414/416; 318/568

[58] Field of Search ..... 364/468, 478, 479, 513; 414/14, 134, 136, 272, 273, 404, 416; 209/608, 630, 903, 904; 318/568, 569

[56] References Cited

U.S. PATENT DOCUMENTS

| | | | |
|---|---|---|---|
| 2,988,237 | 6/1961 | Devol | 214/11 |
| 3,517,831 | 6/1970 | Hahn | 414/416 X |
| 3,520,406 | 7/1970 | Turner | 209/111.5 |
| 3,639,728 | 2/1972 | Helfand et al. | 364/478 |
| 3,700,128 | 10/1972 | Noble et al. | 214/40 |
| 3,712,484 | 1/1973 | Wahlbeg | 214/11 R |
| 3,884,370 | 5/1975 | Bradshaw et al. | 414/134 |
| 3,915,851 | 10/1975 | Stevenson, III | 209/74 M |
| 4,058,217 | 11/1977 | Vaughan et al. | 209/74 M |
| 4,181,947 | 1/1980 | Krauss et al. | 364/478 |
| 4,239,432 | 12/1980 | Richardson | 414/416 X |
| 4,239,435 | 12/1980 | Weiss et al. | 414/136 |
| 4,331,417 | 5/1982 | Shearer, Jr. | 414/273 |
| 4,336,589 | 6/1982 | Smith et al. | 364/478 X |
| 4,363,585 | 12/1982 | Keller et al. | 414/273 |
| 4,451,967 | 6/1984 | Stobb | 414/273 X |
| 4,503,507 | 3/1985 | Takeda et al. | 364/513 |

*Primary Examiner*—Stephen C. Buczinski
*Assistant Examiner*—Linda J. Wallace

[57] ABSTRACT

A robotic kitting apparatus takes parts bags containing electronic components and places the bags in appropriate kit boxes for use in assembling electronic products. Each parts bag has a bar coded allocation tag that is read by a bar scanner. A computer controls a claw machine that picks up the parts bag from a conveyer belt and moves it to a kit box requiring that parts bag.

1 Claim, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BEST AVAILABLE COPY

ROBOTIC KITTING

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to electronic component packaging systems, and, more particularly, relates to an apparatus and method for automatically assembling electronic component kits.

The assembling of components for a printed circuit board, for example, is a complicated process involving significant amounts of handling, allocating and parts preparation when numerous printed circuit boards are being assembled with numerous components. The difficulty of having the right part available at the right time becomes an almost impossible task without having a large number of persons present.

In the past, a kitting clerk having a required parts list for a particular board went to a parts store having numerous bins of individual parts. The clerk selected the required parts and placed them in a kit bag one at a time until the kit was completed. The kit assembled, further, may be only for a portion of a larger assembly. The completed kit is then placed in a box having the other required kits. The completed box itself is then placed in a storage area designated as a next higher assembly area. The amount of kitting, boxing, etc. required is dependent upon the end product and detailing herein would be difficult except to point out that each kit has normally in the past been placed manually into a box for storage.

SUMMARY OF THE INVENTION

The instant invention sets forth a robotic kitting apparatus and method that overcome the problems noted hereinabove.

In general, electronic components are first prepared for kitting. These components can be classified into axial, flat packages, and radial components depending on the positions of the leads. This preparation includes placing allocation tags on the components and cutting leads to proper lengths. After this, the components are placed in parts storage containers such as carousels associated with work-in-progress or other containers. From the work-in-process storage (WIP), another set of allocation tags are attached for directing further distribution. The parts are then placed in bags and the bags are placed in kits. At this point additional allocation tags are placed on the kits directing further distribution in the assembly chain. Based on a production schedule, kits are released and eventually are combined with purchased and manufactured parts to make an end product.

Specifically, kitting of lot size components is carried out by an apparatus that selects marked parts bags of lot size components and places these bags in selected kit boxes based on the type of components in each bag and the requirement of the selected kit.

In order to place these bags, the marked bags are automatically scanned by a bar code scanner, for example, if such coding is used, as the marked bags come down a conveyor belt from the component preparation and counting area or from the WIP storage. A bar code scanner is located at each row of kit boxes appropriately placed along the conveyer belt and each row is perpendicular to the conveyor belt. If a particular bag is required in that row of kits as determined by a computer connected to the bar code scanner, the conveyor belt is stopped under a transporting device associated with that row. The transporting device then picks up the selected marked bag and moves it over a predetermined kit box into which the selected marked bag is dropped. The position at which the transporting device is stopped can be determined through a cam mechanism at each kit box location or through magnetic indicators also at each location. The transporting device can move either left or right of the conveyor belt. The number of kit boxes per row and the number of rows is dependent on optimum processing speed associated with the end product.

It is therefore one object of the present invention to provide a means for robotic kitting of electronic components.

It is another object of the present invention to provide an apparatus that is an integral part of an electronic component assembly line.

It is still another object of the present invention to provide a pick-and-place robot used in conjunction with computer controls to assembly kits of electronics parts.

These and many other objects and advantages of the present invention will be readily apparent to one skilled in the pertinent art from the following detailed description of a preferred embodiment of the invention and related drawings.

DETAILED DESCRIPTION OF THE PREFERRED EMBODIMENT

Figure 1:
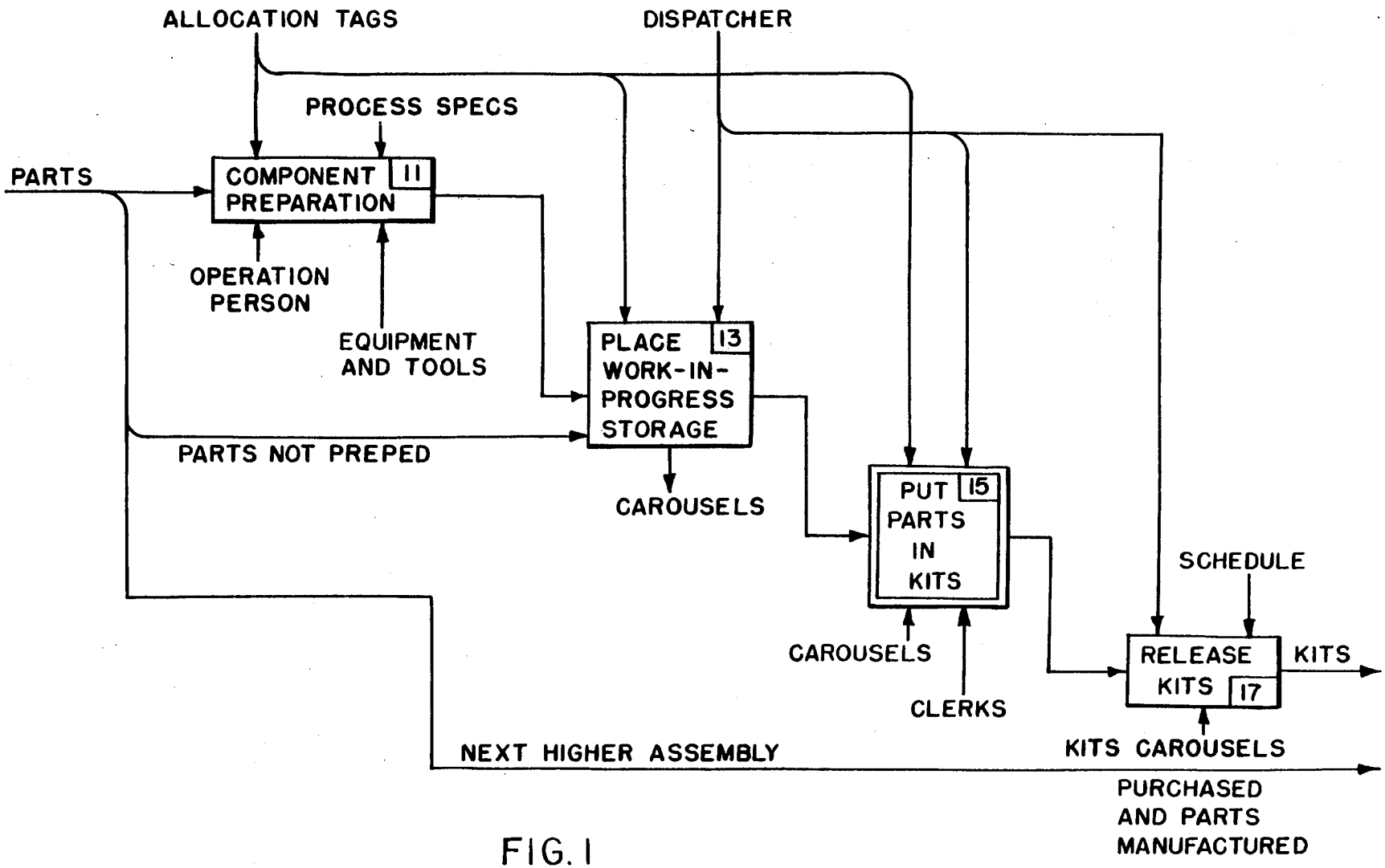
FIG. 1 is a flow diagram showing steps required to prepare parts for assembly.

Referring to FIG. 1, a general flow diagram of the steps required to group parts for assembly is shown. Input are three types of parts (1) those requiring some preparation, (2) those not requiring preparation and (3) those that go directly into the assembly area without storage. Parts not requiring preparation are placed into work-in-progress storage, block 13. In block 11, the parts are prepared in accordance with specifications and allocations required. For Example, 5% and 10% resistors are separated and grouped as to allocation. Leads on parts may be cut to proper length. After this, these prepared parts are also placed in WIP storage.

From WIP storage, a clerk pulls lot sized packages of parts and places these in appropriate kits based on another set of allocation tags. The completed kits are then placed in carousels awaiting a demand.

When a production schedule requires a particular kit, block 17 of FIG. 1, the kit is given a further allocation tag and shipped to the assembly area along with the manufactured parts required.

Figure 2:
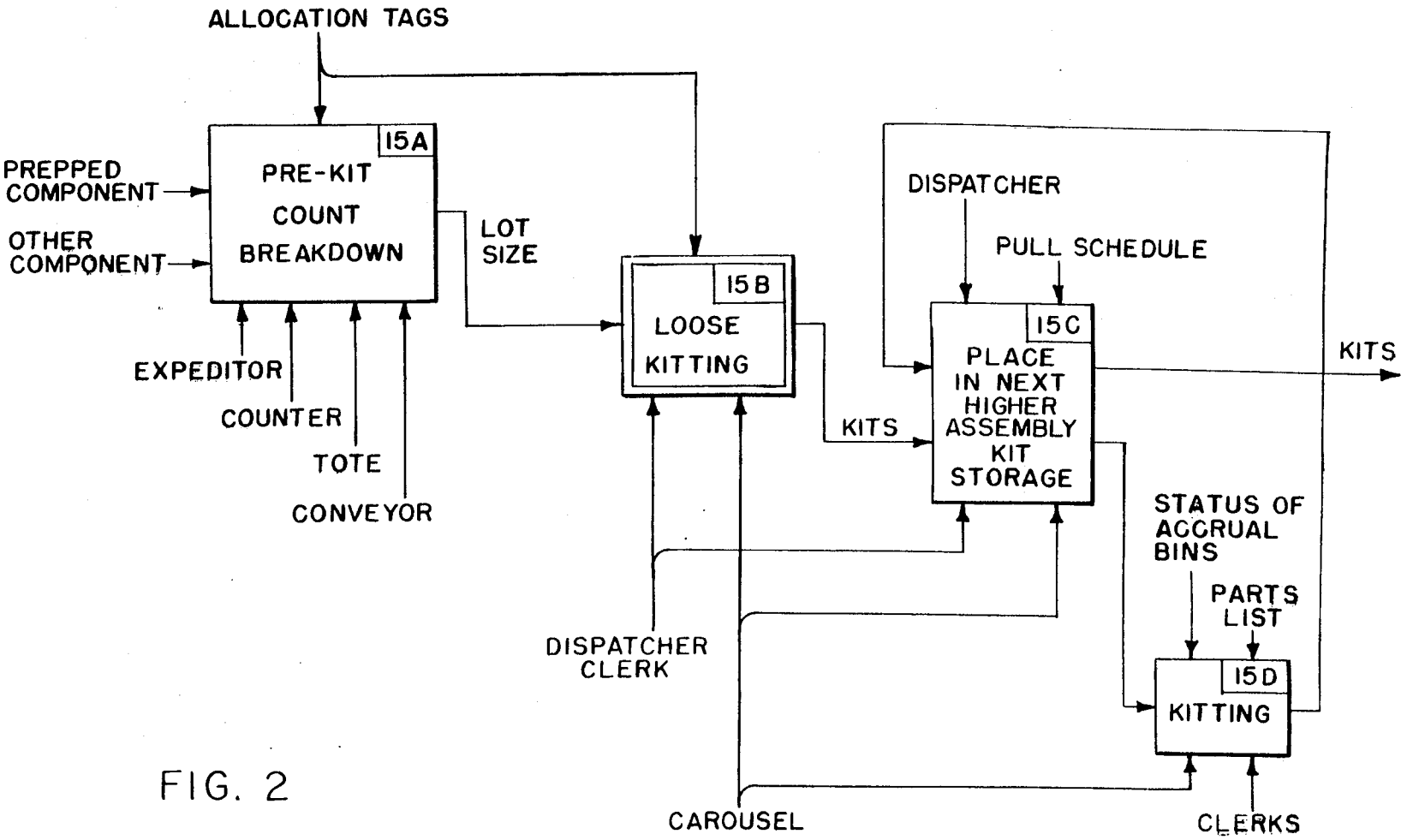
FIG. 2 is a further detailing of block 15 of FIG. 1.

Block 15 of FIG. 1 is further expanded in FIG. 2. From WIP storage of FIG. 1, block 13, prepared parts

BEST AVAILABLE COPY and non-prepared parts are input into a count and breakdown area, block 15A of FIG. 2, wherein a counter bags in lot sizes parts based on input allocation tags. These parts bags are output with allocation tags to a loose kitting area, block 15B, where selected parts bags are placed in kit boxes to be detailed hereinafter. The kit boxes with allocation tags are then placed in the next higher assembly storage of FIG. 2, block 15C, or grouped with other kits formed from block 15D.

Figure 3:
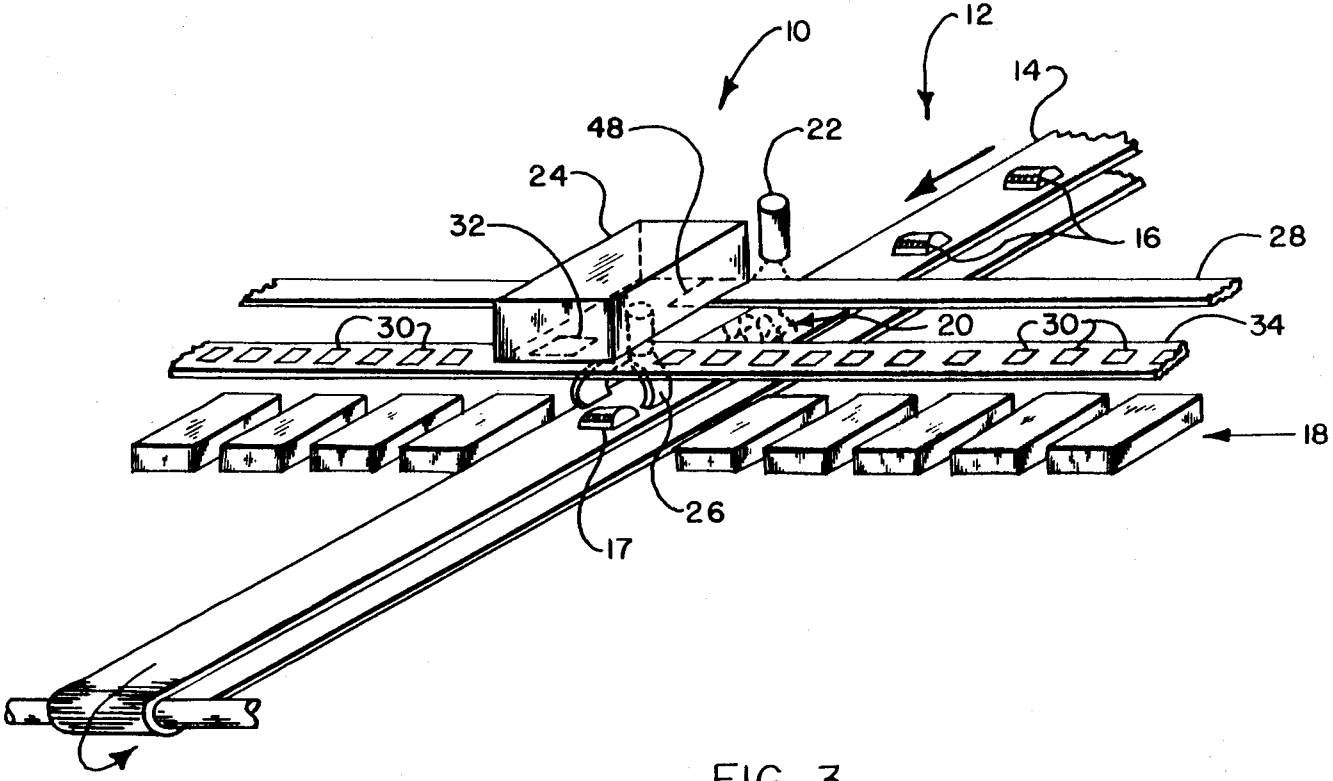
FIG. 3 is a pictorial view of the robotic kitting apparatus of this invention used in block 15B of FIG. 2.

FIG. 3 shows pictorially a robotic kitting apparatus 10 associated with the loose kitting block 15B of FIG. 2. A plurality of parts bags 12 are placed on a conveyer belt 14. Parts bags 12 come from either WIP stores or a counting and breakdown area. Bags 12 are labeled with a bar code tag 16 that determines to which kit box 18 of a plurality of kit boxes 18 bag 12 is allocated to by demand. Belt 14 moves bags 12 to a scanning area 20 where a conventional bar scanner 22 reads bar code tags 16.

Figure 6:
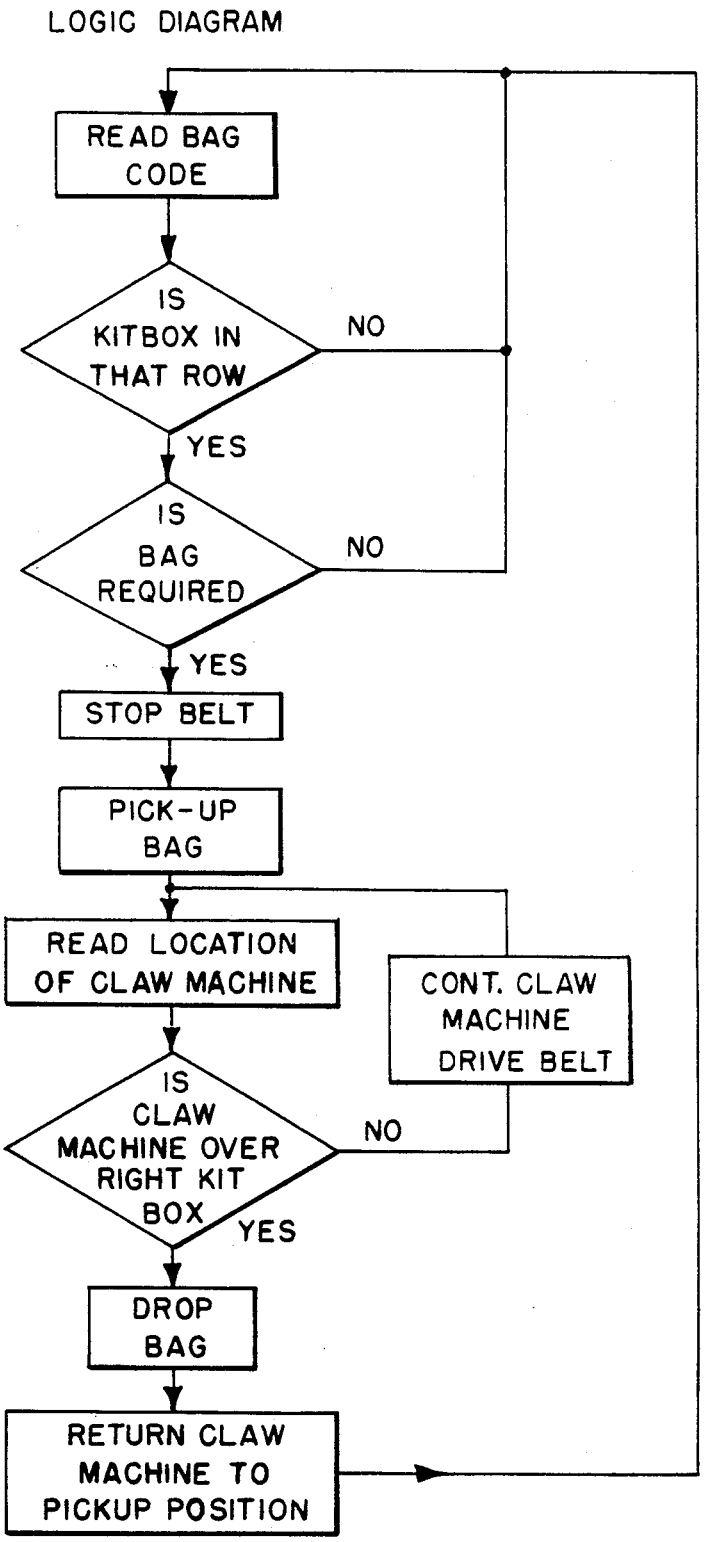
FIG. 6 is a logic diagram used by a computer to control the claw machines of this invention.

Based upon the information in each bar code tag 16, a programmed computer 48, shown in outline, stops belt 14 so that a selected bag 17 is under a claw machine 24. A possible logic diagram used to program computer 48 is shown in FIG. 6. After belt 14 stops, a pair of claws 26 closes upon and lifts selected bag 17 from belt 14. Claw machine 24 is attached to a drive belt 28 that moves to either side, if so required, of belt 14.

Claw machine 24 once over the designated kit box 18 opens claws 26 and selected bag 17 falls into designated kit box 18; thereafter, claw machine 24 recenters on belt 14 to pick up another selected bag 17.

The means for stopping claw machine 24 over the designated kit box 18 based on bar code tag 16 can be, for example, a magnetic indicator 30 placed over each kit box 18 on a track 34 on which claw machine 24 rides. A magnetic pickup 32 shown in outline on the underside of claw machine 24 reads information on magnetic indicator 30 and thus causes drive belt 28 to stop over the designated kit box 18. Another possible means is to have at each kit box location a solenoid operated cam, not shown, mounted on track 34. Computer 48 determines the designated kit box 18 at which claw machine 24 must stop and raises a cam at that location. The cam would operate on a microswitch, not shown, located on the underside of claw machine 24 to cause drive belt 28 to stop. Another alternative is a device that measures the amount of travel of drive belt 28 and stops belt 28 at the proper location. After selected bag 17 is dropped into designated kit box 18, claw machine 24 is returned to the center location.

Figure 5:
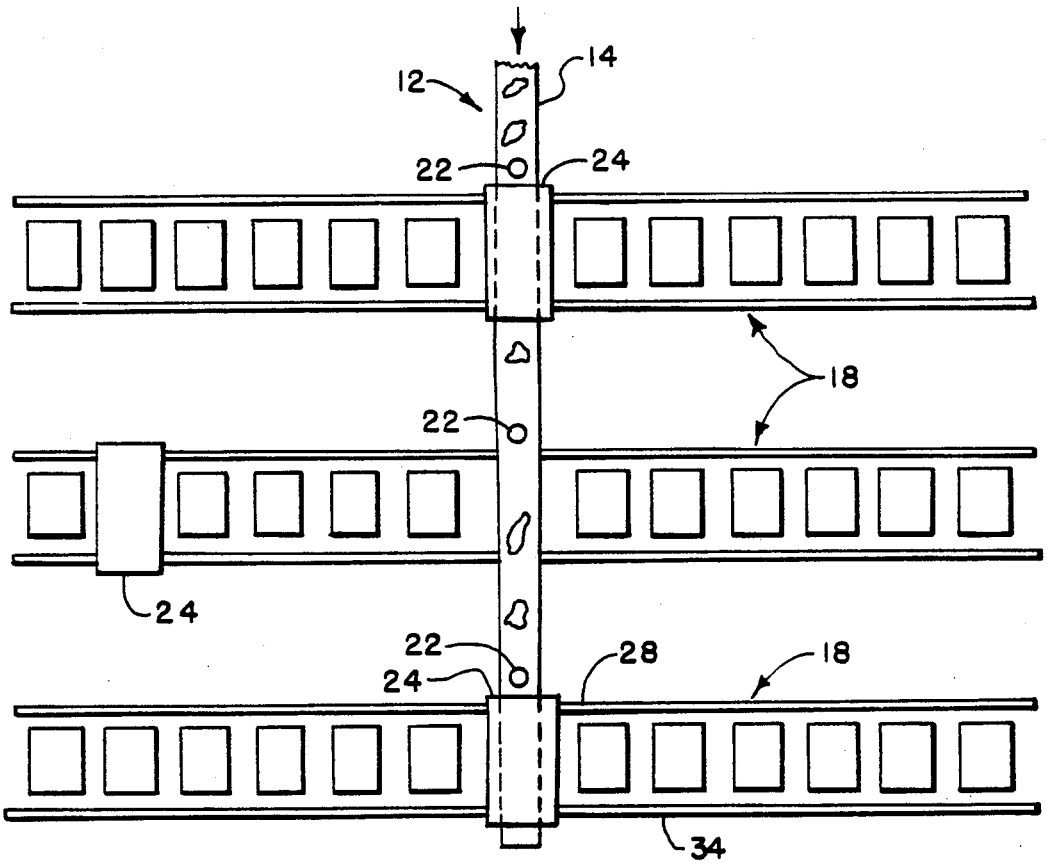
FIG. 5 illustrates in plan view a possible arrangement of three claw machines of this invention.

Kit boxes 18 may be located on either side of belt 14 and there may be more than one row of kit boxes 18. One possible arrangment is shown in FIG. 5. The optimum arrangement is dependent on the end product, speed of belts 14 and 28, and the time required to fill kit boxes 18.

Figure 4:
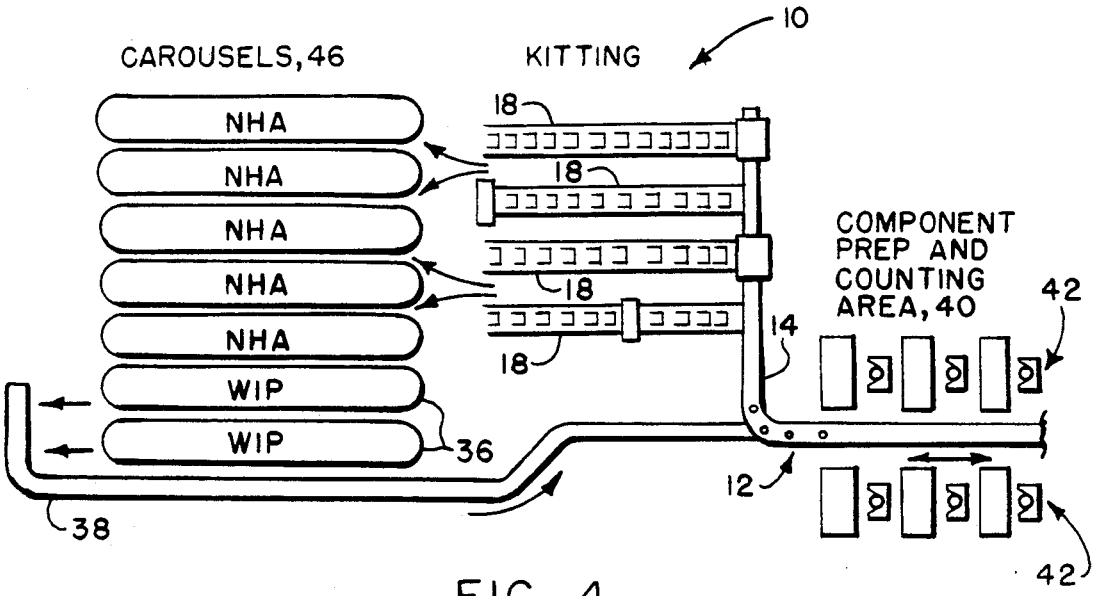
FIG. 4 is a pictorial view of an arrangement of equipment used in block 15B of FIG. 2.

One arrangement of a kitting area is shown in FIG. 4. Parts are pulled from WIP carousels 36 and placed on a conveyor belt 38 feeding a component preparation and counting area 40 where clerks 42 take parts from belt 38. After the appropriate actions are taken on each part, the parts bags 12 are placed on belt 14 that feeds robotic kitting apparatus 10. Four rows of kit boxes are positioned to one side of belt 14. This is a more efficient configuration since workers do not have to walk around belt 14 to reach other kit boxes 18. The finished kit boxes 18 are placed in next higher assembly carousels 46, for example, awaiting future demand.

Clearly, many modifications and variations of the present invention are possible in light of the above teachings and it is therefore understood, that within the inventive scope of the inventive concept, the invention may be practiced otherwise than specifically claimed.

What is claimed is:

1. A robotic kitting apparatus for assembling electronic parts in kits comprising:

a conveyor, said conveyor including a belt having a plurality of parts bags containing electronic parts placed on said belt, each of said parts bags having attached thereon an allocation tag with information thereon;

means for reading said information contained on said allocation tag, said means for reading being located approximate to said conveyor belt for reading said allocation tag information;

a computer, said computer being adapted to receive said allocation tag information from said means for reading, said computer programmed to control the robotic kitting apparatus;

a plurality of kit boxes, each of said kit boxes sequentially arranged in a plurality of rows perpendicular to said conveyor belt, a single means for reading being positioned before said, plurality of rows;

a plurality of means for kitting said parts bags on said conveyor belt, a number of said means for kitting being equal to the rows of kit boxes, said means for kitting being positioned downstream from said means for reading, said means for kitting transporting a selected parts bag to a designated kit box for depositing therein, one means for kitting operating on a single row of kit boxes, each of said means for kitting comprising:

a claw machine that releasably engages said selected parts bag identified by said means for reading a drive belt attached to said claw machine for moving said claw machine over said designated kit box;

a track, said track providing a surface upon which said claw machine translates over said kit boxes; and means for determining when to release said selected parts bag.

* * * * *